A. M. CRAIG.
SHOCK DIFFUSER FOR FIREARMS.
APPLICATION FILED NOV. 19, 1919.

1,367,354.

Patented Feb. 1, 1921.

Alvin M. Craig, Inventor
By his Attorney
W. B. Hutchinson

UNITED STATES PATENT OFFICE.

ALVIN M. CRAIG, OF NEW HAVEN, CONNECTICUT.

SHOCK-DIFFUSER FOR FIREARMS.

1,367,354.   Specification of Letters Patent.   Patented Feb. 1, 1921.

Application filed November 19, 1919. Serial No. 339,246.

*To all whom it may concern:*

Be it known that I, ALVIN M. CRAIG, a citizen of the United States, and a resident of the city of New Haven, county of New Haven, and State of Connecticut, have invented a new and useful Improvement in Shock-Diffusers for Firearms, of which the following is a full, clear, and accurate description.

My invention relates to improvements in shock diffusers for firearms, and especially such arms as have a bolt or similar part which slides backward and forward under the recoil action of the gun, and the general object of my invention is to produce a simple device which will diffuse and practically eliminate the shock of the recoil. My invention utilizes the principle of a screw plunger and nut, in which the plunger moves longitudinally and either rotates in the nut or else moves endwise and revolves the nut, and in either case the shock of a blow on the plunger is distributed through the threads of the plunger and nut, and gradually and effectively absorbed. This is because the first violent impact on the plunger is received and resisted by the several threads, but as their contact is a sliding one owing to the rotation of one member on the other, the shock is gradually absorbed and distributed throughout the length of the engaging threads or members. In carrying out this idea, I arrange the screw plunger and nut in a compact framework which is preferably in the form of a casing, so that in working the parts may be tightly inclosed and out of the way of dirt, dust, and extraneous matter. Such an absorber and diffuser is peculiarly adapted for use in absorbing and diffusing the shock or recoil of a gun, and more particularly guns of the automatic type in which a sliding member like the bolt or a carrier which moves with the bolt, strikes against the diffuser or absorber. The advantages of this peculiar application of the invention will be hereinafter pointed out.

Reference is to be had to the accompanying drawings forming a part of this specification, in which similar reference characters indicate corresponding parts in all the views.

Figure 2:
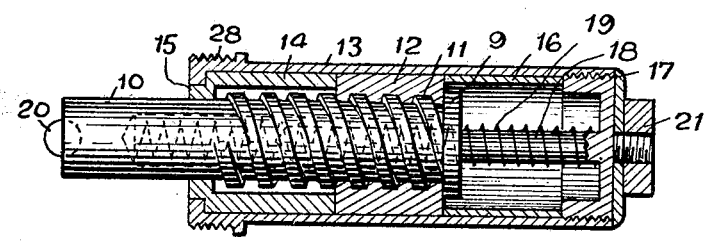
Fig. 2 is an enlarged longitudinal section of the shock diffuser and absorber, in which the plunger slides and rotates.

In Fig. 2 I have shown an embodiment of my invention in which a sliding member or plunger 10 is provided for a part of its length with a coarse screw thread 11 which engages a corresponding thread in a complementary member 12 which is in the form of a nut, which as illustrated is swaged firmly into its casing or framework 13, or otherwise fastened so as to keep it from turning. The essential thing is to hold the nut in a fixed position relative to the plunger 10, and to keep the nut from turning. It can be conveniently spaced in the casing or framework 13 by means of the sleeves 14 and 16, the former fitting between one end of the nut member 12 and the end of the casing 13 and being preferably reduced as shown at 15 so as to act as a guide for the plunger. At the opposite end of the nut is a second spacing sleeve 16 which is held in position by a nut 17 screwing into the rear end of the casing 13.

At its forward extremity the plunger 10 can be provided with an anti-friction device, as for instance a ball 20, to reduce friction between the plunger 10 and the member which strikes and pushes it back. The plunger is normally pushed forward and outward by a spring 19 which is coiled around a guide pin 18 rising from the nut 17, and the guide pin enters the plunger which is hollow, and the spring also lies within the hollow part of the plunger.

To make the device easily applicable to a gun, a threaded opening 21 and nut 21ª can be had at the rear end. When a violent shock is applied to the outer end of the plunger 10 the tendency is to move it quickly inward, but this tendency is resisted by the engaging threads of the plunger and nut member 12, and the resistance is not too sudden, owing to the fact that the contact between the thread members is a sliding contact, and thus the plunger moves rearward and rotates, and the resistance is sufficient to gradually absorb and diffuse the shock which is applied to the plunger. As the pressure on the outer part is removed, however, the spring 19 pushes the plunger back to its forward position and the limiting flange 9 on the inner end of the plunger engages the nut 12 and prevents the plunger from moving too far outward. In practice the plunger moves back and offers considerable resistance to the stress applied to it because of the heavy pressure of the threads 11 against the threads of the nut 12, but on the return movement when the recoil pressure on the threads is removed, the spring 19 moves the plunger easily to its outward position.

The spring 19 assists in offering resistance to the recoil of the member 30, and it should be stiff enough to quickly throw back the plunger 10 so that if the gun is being used as an automatic, the plunger will follow up the member 30 and there will be no danger of its moving so slowly as to meet the member 30 on its recoil stroke.

Figure 3:
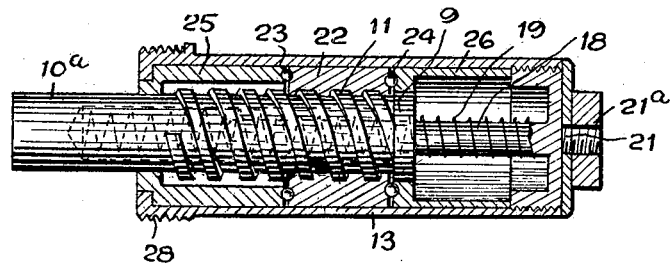
Fig. 3 is a view similar to Fig. 2 but slightly modified, showing the nut member as being rotatable.

In Fig. 3 I have shown a slight modification which is rather obvious, in which the plunger 10$^a$ moves inward as already described, but does not turn, and in this case the movement of the plunger lengthwise imparts a rotary motion to the nut member 22 which engages the threads 11 of the plunger, and in order that the nut member may turn freely it is preferably provided with ball bearings 23 and 24 at its ends, the bearings 23 being arranged between the nut member 22 and the sleeve 25 which is like the sleeve 15 already described, while the bearing 24 is between the inner end of the nut member 22 and the sleeve 26 which corresponds to the sleeve 16 already described.

Figure 1:
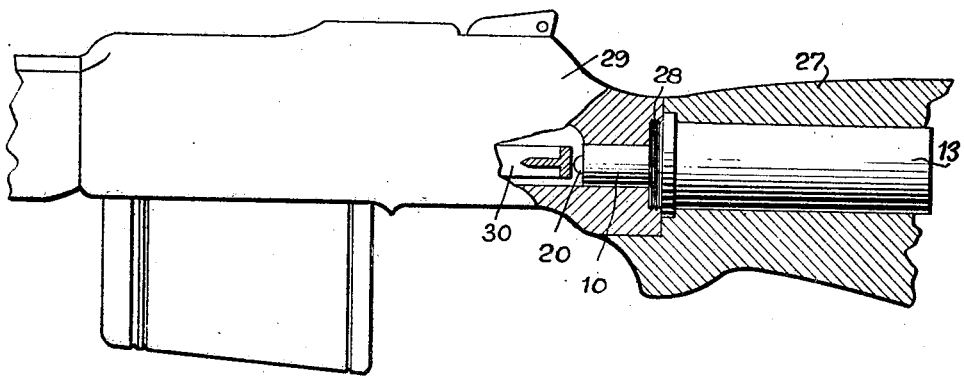
Figure 1 is a broken sectional elevation of a well-known type of automatic gun with my improved attachment applied thereto.

In Fig. 1 I have shown the application of the improved shock absorber and diffuser to a well-known type of automatic gun, that illustrated being of the Browning type. In this case, the casing 13 lies in the stock 27 of the gun, and the forward end of the casing is screw threaded as shown at 28, and screws into the receiver 29 of the gun so that the plunger 10 will lie in the path of the carrier 30 which carries the bolt of the gun of this type and moves with the bolt. The device is especially adapted to such a use as that illustrated in Fig. 1, because in actual practice the recoil of this gun has been found to be so heavy as to seriously interfere with its efficient use, and moreover the guns shoot too rapidly. With this device, however, the shock of the recoil is very much lessened and diffused, and by reason of the gradual absorption of the shock by the screw plunger, and by the gradual movement of the plunger back under the recoil of the carrier 30 and the bolt therein, the movement of the carrier is made slower and the gun can be made to shoot far less rapidly than it does as ordinarily used.

Attention is called to a peculiar advantage of the construction described which is that the inward movement of the plunger causes a very much greater and prolonged movement of rotation, and it will be observed that the resistance to the shock is at the circumference of the plunger, and thus a long, gradual resisting effect is offered to the shock even though the plunger moves but slightly. For instance, if the plunger is an inch in diameter and moves inward an inch, the distance of travel of its surface, and hence the effective resistance offered to the shock, assuming an inch pitch of thread, would be three inches; but obviously this surface distance, as stated above, can be varied by varying the pitch of the screw and the diameter of the plunger. With the revolving nut the effect is obviously the same except that the parts are reversed.

By many actual experiments with this shock diffuser, and especially in guns of the automatic type, I have found that the sharp blow on the shoulder is practically eliminated when the gun is used in firing a single shot. When firing is automatic, the sharp initial blow and all of the succeeding blows found in a rifle equipped with the standard buffer, are practically eliminated when the rifle is equipped with my diffuser, and in place of this there is a steady shove against the shoulder from the beginning to the end of the burst. It is unnecessary for the operator to brace himself when using a rifle equipped with my diffuser, as he never receives a shock or steady succession of shocks during the complete burst, thus materially adding to the life of the gun, and the bolt is brought to a gentle stop at its extreme rearward movement.

With my diffuser the rate of firing is also greatly reduced, which is an important item, as most automatic guns shoot much too rapidly and waste a great deal of ammunition. With the standard buffer, the rifle ejects the cartridge cases sharply to the right out of the ejection opening, but with my diffuser the same rifle is found to eject entirely satisfactorily without spinning the cartridge cases out to a distance from the rifle, as with the standard.

I claim—:

1. The combination with a gun having a member therein which slides under the gun recoil, of a shock diffuser comprising a casing or framework, means for attaching it to a gun in alinement with the aforesaid sliding member thereof, a plunger movable longitudinally in the casing and adapted to abut with the sliding member of the gun, said plunger having a screw thread thereon, and a complementary nut member held in the casing and engaging the screw thread of the plunger, the plunger and nut member being rotatable with relation to each other.

2. The combination with a gun having a member therein which slides under the gun recoil, of a shock diffuser arranged in the path of said sliding member and characterized by a plunger having a screw thread thereon, and a complementary nut member engaging the screw thread of the plunger, the plunger and nut member being rotatable with relation to each other.

3. The combination with a gun having a member sliding under the recoil of the gun, of a shock diffuser and absorber supported in the gun in the path of said sliding member, and comprising a plunger adapted to be moved by the aforesaid sliding member, said plunger having a screw thread thereon, a nut member engaging the screw thread of the plunger, the nut member and plunger being rotatable with relation to each other, and means for holding the nut member and plunger in proper relation.

4. The combination with a gun having a receiver with a member sliding therein under the recoil of the gun discharge, of a shock absorber and diffuser comprising a casing or framework connected to the receiver, a plunger sliding in said framework or casing and arranged to lie in the path of the aforesaid sliding member, said plunger having a screw thread thereon, and a nut member held in the casing or framework and engaging the screw thread of the plunger, the nut member and plunger being rotatable with relation to each other.

5. The combination with a gun having a member sliding under the recoil of the gun, of a shock diffuser and absorber supported in the gun in the path of said sliding member and comprising a plunger adapted to be moved by the aforesaid sliding member, said plunger having a screw thread thereon, and a nut member engaging the screw thread, the nut member and plunger being rotatable with relation to each other, and a spring arranged to urge the plunger toward the sliding member of the gun.

ALVIN M. CRAIG.

Witnesses:
WARREN B. HUTCHINSON,
M. G. O'DONNELL.